United States Patent [19]
Mair

[11] 3,894,942
[45] July 15, 1975

[54] VOLATILE GASOLINE VAPOR RECOVERY SYSTEM

[75] Inventor: James Mair, Chicago, Ill.

[73] Assignee: General American Transportation Corporation, Chicago, Ill.

[22] Filed: Mar. 23, 1971

[21] Appl. No.: 127,259

[52] U.S. Cl. .................. 208/308; 62/17; 62/20; 62/27; 62/29; 62/28; 208/368
[51] Int. Cl. ............................................. F25j 3/02
[58] Field of Search ............... 62/17, 20, 23, 29, 27, 62/28, 29, 26, 30, 40, 41; 55/65; 208/345, 344, 368, 308

[56] References Cited
UNITED STATES PATENTS

| | | | |
|---|---|---|---|
| 2,173,456 | 9/1939 | Sullivan | 208/345 |
| 2,237,386 | 4/1941 | Carney | 208/344 |
| 2,278,999 | 4/1942 | Kuhl | 62/17 |
| 2,643,527 | 6/1953 | Keith | 62/13 |
| 2,708,490 | 5/1955 | Guinot | 62/17 |
| 2,745,889 | 5/1956 | Johnston | 208/344 |
| 2,780,580 | 2/1957 | Kniel | 62/23 |
| 2,805,734 | 9/1957 | Riess | 62/23 |
| 2,849,371 | 8/1958 | Gilmore | 55/88 |
| 2,870,867 | 1/1959 | Bartholome | 55/65 |
| 3,325,972 | 6/1967 | Fritz | 55/65 |

*Primary Examiner*—Norman Yudkoff
*Assistant Examiner*—Frank Sever
*Attorney, Agent, or Firm*—Prangley, Dithmar, Vogel, Sandler & Stotland

[57] ABSTRACT

A system for recovering volatile combustible liquids from a vapor stream includes a vapor saturator for saturating and cooling the vapor stream with subcooled liquid product, a plurality of high pressure condenser stages, each such stage compressing and further cooling the vapor stream and condensing it by direct contact with subcooled liquid product for forming liquid product and residual vapors, a terminal condensing stage for further condensing the residual vapors with subcooled liquid product, means for venting the uncondensed vapors to atmosphere, a closed loop external refrigeration system for subcooling a portion of the recovered liquid product, and pump means for recycling the subcooled liquid product to the saturator and the condenser stages, and a reservoir for collecting the uncycled liquid product.

8 Claims, 1 Drawing Figure

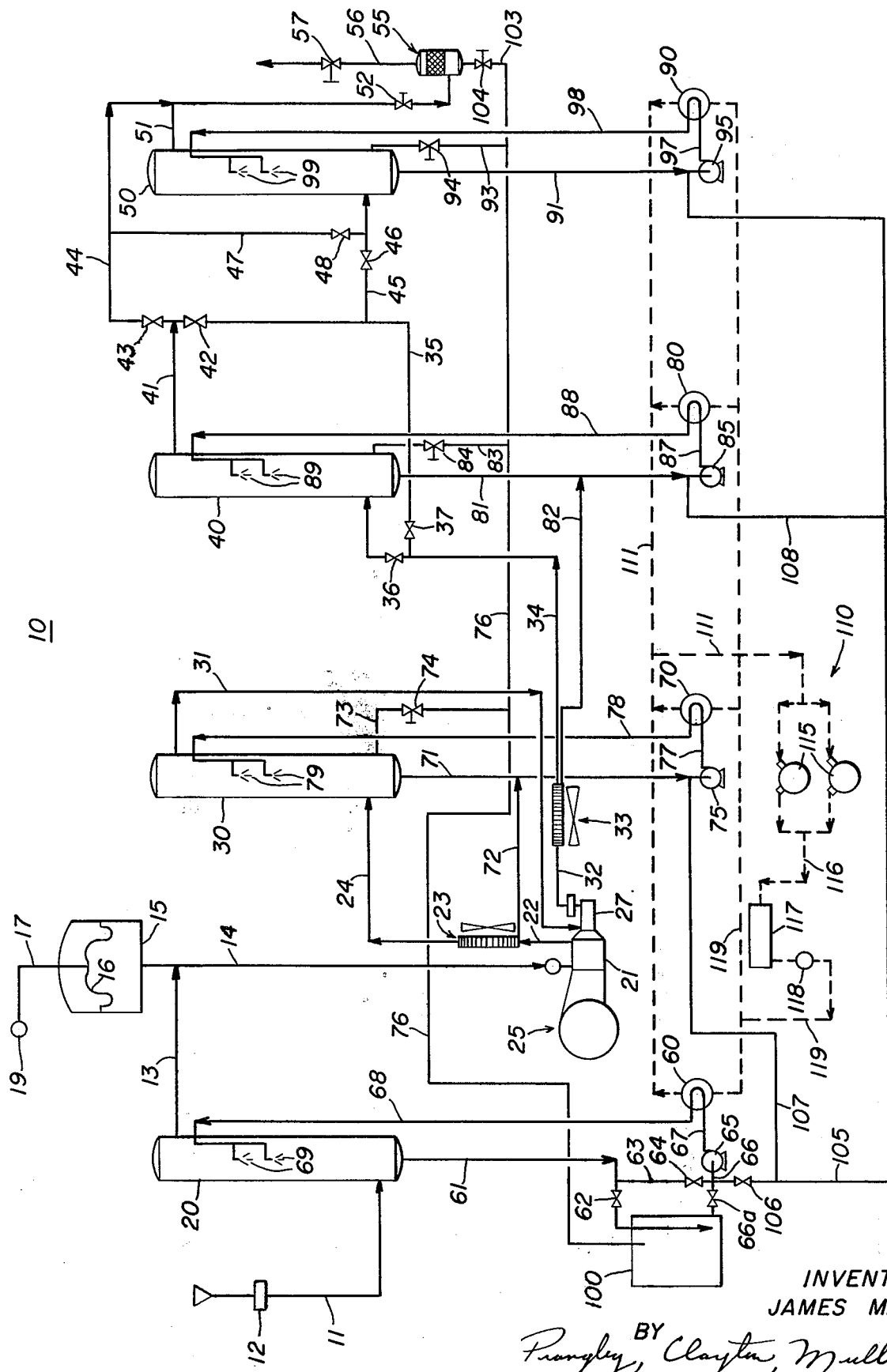

VOLATILE GASOLINE VAPOR RECOVERY SYSTEM

The present invention relates to the recovery of liquid product from a vapor stream, and more particularly to the recovery of combustible liquid product such as hydrocarbons.

More particularly, this invention relates to the recovery of liquefiable components of a vapor stream by contacting the vapor stream with the subcooled liquid product itself for condensing the vapors.

It is a general object of this invention to provide an apparatus and method for recovering volatile liquids from a vapor stream, the apparatus including a condenser for contacting the vapor stream with subcooled liquid product, and cooling and recycling means for cooling a portion of the recovered liquid product and returning it to the condenser.

It is an important object of this invention to provide a system for recovering volatile liquids from a vapor stream, the system comprising a compressor having an inlet and an outlet, the compressor inlet communicating with a vapor source for delivering an input vapor stream to the compressor, vapor cooling means having an inlet connected to the outlet of the compressor and an outlet, a condensor having a vapor inlet and a vapor outlet and a liquid product inlet and first and second liquid product outlets, the vapor inlet being disposed adjacent to the bottom of the condenser and being connected to the outlet of the vapor cooling means for introducing a cooled compressed vapor stream into the condenser, a pump having an inlet connected to the first liquid product outlet of the condenser and an outlet, liquid product cooling means having an inlet connected to the outlet of the pump and an outlet and being operative for subcooling recovered liquid product to a temperature below that of the cooled compressed vapor stream, the liquid product inlet being disposed adjacent to the top of the condenser and being connected to the outlet of the liquid product cooling means for introducing subcooled liquid product into the condenser in countercurrent relationship and direct contact with the cooled compressed vapor stream to effect condensation thereof and thereby form liquid product and a residual vapor stream, vent means connected to the vapor outlet of the condenser for discharging the residual vapor stream therefrom, and a liquid product reservoir connected to the second liquid product outlet of the condenser for receiving and storing recovered liquid product.

It is another object of this invention to provide a system including a plurality of stages of recovery apparatus of the type set forth.

In connection with the foregoing object, it is another object of this invention to provide a multistage system, which includes a plurality of introductory stages of the type set forth and a terminal stage comprising a condenser of the type set forth and liquid product pump and cooling means of the type set forth for directly receiving the residual vapor stream from the last introductory stage and further condensing it to form additional liquid product and an outlet vapor stream which is discharged by the vent means.

It is another object of this invention to provide a system for recovering volatile combustible liquids, which includes condensing apparatus of the type set forth, and further including saturating apparatus for cooling and saturating the input vapor stream by direct contact with subcooled liquid product to form a nonexplosive saturated vapor stream for introduction to the condensing apparatus.

In connection with the foregoing object, it is another object of this invention to provide a recovery system of the type set forth, which includes multistage condensing apparatus of the type set forth.

Still another object of this invention is to provide a method for recovering volatile liquids from an input vapor stream, comprising the steps of compressing the input vapor stream, precooling the compressed vapor stream, condensing the compressed and precooled vapor stream by passing it in countercurrent relationship and direct contact with a recirculating stream of liquid product at a subcooled temperature below that of the cooled compressed vapor stream to form additional liquid product and a residual vapor stream, continuously recirculating and refrigerating a portion of the recovered liquid product for use in the condensing step, passing the remainder of the recovered liquid product to a storage reservoir, and venting the uncondensed residual vapor stream to atmosphere.

In connection with the foregoing object, it is another object of this invention to provide a method comprising a plurality of condensing stages, each including steps of the type set forth.

Further features of the invention pertain to the particular arrangement of the parts of the recovery system and the steps of the recovery method, whereby the above-outlined and additional operating features thereof are attained.

The invention, both as to its organization and method of operation, together with further objects and advantages thereof, will best be understood with reference to the following specification taken in connection with the accompanying drawing, which is a diagrammatic representation of the recovery system of the present invention, indicating the vapor and liquid flow paths therethrough.

With reference to the drawing, there is illustrated a vapor recovery system, generally designated by the numeral 10, constructed in accordance with and embodying the features of the present invention. The system includes a vapor input conduit 11 for receiving an input vapor stream through a conventional flash arrester 12 and passing the vapor stream to the vapor inlet adjacent to the lower end of a saturating vessel 20, for saturating the input vapor stream in a manner to be described below. The saturating vessel 20 is provided with a vapor outlet adjacent to the upper end thereof communicating with an output conduit 13, which in turn communicates with a conduit 14 for passing the saturated vapor stream to a surge tank 15. The surge tank 15 is provided with a flexible diaphragm 16 having connected thereto a pressure responsive device (not shown) which is in turn connected by conduit 17 to a control switch 19. The control switch 19 is connected through an electric control circuit (not shown) to the motive machinery of the system 10 for controlling the operation thereof. More particularly, when the volume of vapor stored in the surge tank 15 reaches a predetermined amount, the diaphragm 16 will rise, whereupon the switch 19 will be actuated for turning on the machinery of the system 10 and drawing the saturated input vapor stream therethrough. When the volume of saturated vapor stored in the surge tank 15 decreases below the predetermined amount, the diaphragm 16 will fall and the switch 19 will again be actuated for deenergizing the system 10 and interrupting the processing of the saturated vapor stream.

The conduit 14 extends from the surge tank 15 to the first stage 21 of a compressor 25 for compressing the saturated vapor stream, which is then passed through an output conduit 22 to a first stage vapor cooler 23 for cooling the compressed vapor stream. The vapor cooler 23 is connected by a conduit 24 to a vapor inlet adjacent to the lower end of a first stage condenser 30 for passing the cooled and compressed vapor stream thereto. The first stage condenser 30 is operative to condense the cooler compressed vapor stream, in a manner to be described below, for forming predetermined liquid product components and a first stage residual vapor stream. The first stage condenser 30 is provided adjacent to the upper end thereof with a vapor outlet connected to a vapor output conduit 31, which is in turn connected to a second stage 27 of the vapor compressor 25 for passing the first stage residual vapor stream thereto. The second stage 27 of the vapor compressor 25 is connected by an output conduit 32 to a second stage vapor cooler 33, which is in turn connected by a conduit 34 through a valve 36 to a vapor inlet adjacent to the lower end of a second stage condenser 40, for passing the cooled and compressed residual vapor stream thereto.

Connected to the conduit 34 upstream of the valve 36 is a bypass conduit 35, having valves 37 and 42 therein for selectively bypassing the vapor stream around the second stage condenser 40. The condenser 40 is operative to further condense the first stage residual vapor stream, in a manner to be described below, for forming additional liquid product components and a second stage residual vapor stream. The condenser 40 is provided adjacent to the upper end thereof with a vapor outlet connected to a conduit 41, which is in turn connected to the valve 42 and a valve 43. The valve 43 is connected by a conduit 44 to a let-down drum 55 through a back-pressure valve 52. The let-down drum 55 is provided with packing and an entrainment separator and is connected by a vent conduit 56 to atmosphere through a back-pressure valve 57, for discharging uncondensed vapors to the atmosphere.

The conduit 35 is connected intermediate the valves 37 and 42 to a conduit 45, which is in turn connected through a valve 46 to a vapor inlet adjacent to the lower end of a terminal stage condenser 50 for introducing residual vapor streams thereto. The condenser 50 is operative for further condensing the residual vapor streams from the first or second stage condensers to form additional liquid product components and an output vapor stream, all in a manner to be described below. The condenser 50 is provided adjacent to the upper end thereof with a vapor outlet connected to an output conduit 51, which is in turn connected to the conduit 44 intermediate the valves 43 and 52 for passing the output vapor stream thereto. The conduit 44 is also connected intermediate the valve 43 and the conduit 51 to a conduit 47, which is in turn connected through a valve 48 to the conduit 45 intermediate the valve 46 and the vapor inlet to the condenser 50.

It will be observed that by appropriate setting of the valves 37, 42, 43, 46 and 48, the terminal stage condenser 50 may be connected in the vapor path either in series with or in parallel with the second stage condenser 40. More particularly, if it is desired to connect the condensers 40 and 50 in series, the valves 37, 43 and 48 are closed and the valves 42 and 46 are opened, whereby the second stage residual vapor stream passes from the condenser 40, through the conduits 41, 35 and 45 to the vapor inlet of the terminal stage condenser 50. If it is desired to connect the condensers 40 and 50 in parallel, the valves 42 and 48 are closed and the valves 37, 43 and 46 are opened, whereby the first stage residual vapor stream passes simultaneously to the vapor inlets of the second stage condenser 40 and terminal stage condenser 50. The second stage residual vapor stream and the terminal stage output vapor stream are each passed directly to the conduit 44 for venting in the usual manner. It will be noted that, if the valve 36 is closed while the valve 37 is opened, the second stage condenser 40 may be bypassed altogether.

Having described the vapor flow through recovery system 10, the liquid flow therethrough will now be described. The saturating vessel 20 is provided at the bottom thereof with a first liquid product outlet connected to conduit 61, which is in turn connected through a valve 62 to a liquid product reservoir 100, for passing liquid product accumulating in the bottom of the saturating vessel 20 to the reservoir 100. Connected to the conduit 61 upstream to the valve 62 is a conduit 63, which is in turn connected through a valve 64 to a conduit 66 which extends from the reservoir 100 to the inlet of a pump 65 through another valve 66a. The pump 65 draws liquid product from the conduit 61 or from the reservoir 100 and passes it to a conduit 67, which is connected between the outlet of the pump 65 and the inlet of a heat exchanger 60. The heat exchanger 60 is connected in a closed-loop external refrigeration system 110, to be described below, which pumps refrigerating fluid through the heat exchanger 60, the liquid product being cooled by evaporation of the refrigerating fluid in the heat exchanger 60. Connected between the outlet of the heat exchanger 60 and a liquid product inlet adjacent to the upper end of the saturating vessel 20 is a conduit 68, for passing refrigerated liquid product to the saturating vessel 20, the refrigerated liquid product being cascaded downwardly through the vessel 20 in countercurrent relationship with the vapor stream, by means of spray nozzles 69. The downwardly cascading refrigerated liquid product directly contacts the upwardly flowing input vapor stream for effecting cooling and saturation thereof, the liquid product then passing out through the conduit 61 for continuous recycling by the pump 65 through the vessel 20 and the heat exchanger 60.

In like manner, the first stage condenser 30 is provided at the bottom thereof with a first liquid product outlet connected to a conduit 71, which is in turn connected to the inlet of a pump 75, the outlet of the pump 75 being connected by a conduit 77 to the inlet of a heat exchanger 70 for cooling the liquid product by evaporation of refrigerant supplied by the closed-loop refrigerating system 110. The outlet of the heat exchanger 70 is connected by a conduit 78 to a liquid product inlet adjacent to the upper end of the first stage condenser 70, for passing the refrigerated liquid product thereto. The refrigerated liquid product is cascaded downwardly through the condenser 30 in countercurrent relationship with the saturated vapor stream by means of spray nozzles 79 for directly contacting the upwardly flowing saturated vapor stream. In this manner, the saturated vapor stream is condensed by the refrigerated liquid product to produce predetermined liquid product components and the first stage residual vapor stream. The recovered liquid product components and the liquid product from the spray nozzles 79 passes through the conduit 71 and is continuously recycled by the pump 75 through the condenser 50 and the heat exchanger 70.

It is possible that certain liquid product components will condense in the first stage vapor cooler 23 and, therefore, a conduit 72 is connected from the vapor cooler 23 to the conduit 71 for passing any liquid product components condensed in the cooler 23 to the pump 75 for recycling through the condenser 30.

The condenser 30 is also provided adjacent to the bottom thereof with a second liquid product outlet connected to a conduit 73, which is in turn connected through a level control valve 74 to a header 76 which extends to the reservoir 100 for passing recovered liquid product thereto. In operation, when the level of recovered and recycled liquid product accumulated in the bottom of the first stage condenser 30 rises to a predetermined point, the level control valve 74 is opened by suitable control means responsive to the liquid product level within the condenser 30, for passing the excess liquid product to the header 76 and reservoir 100. When the level of recovered and recycled liquid product in the condenser 30 drops below the predetermined point, the level control valve 74 is reclosed.

Similarly, a liquid product output conduit 81 is connected from a first liquid product outlet at the bottom of the second stage condenser 40 to the inlet of a pump 85, the outlet of the pump 85 being connected by a conduit 87 to the inlet of a heat exchanger 80 for cooling the liquid product by evaporation of refrigerant supplied by the closed-loop external refrigeration system 110. The outlet of the heat exchanger 80 is connected by a conduit 88 to a liquid product inlet adjacent to the upper end of the condenser 40 for introducing refrigerated liquid product thereto. The refrigerated liquid product is cascaded downwardly through the condenser 40 in countercurrent relationship with the residual vapor stream by means of spray nozzles 89 for direct contact with the upwardly flowing residual vapor stream from the conduit 34. In this manner, the vapor stream is further condensed to form additional liquid product components and the second stage residual vapor stream. The recovered liquid product components and the liquid product from the nozzles 89 pass through the outlet conduit 81 for continuous recycling by the pump 85 through the condenser 40 and the heat exchanger 80. Since certain liquid product components may condense in the first stage liquid product cooler 33, a conduit 82 is connected between the cooler 33 and the conduit 81 for passing such condensed liquid product components to the pump 85.

The condenser 40 is also provided adjacent to the lower end thereof with a second liquid product outlet connected to a conduit 83, which is in turn connected through a level control valve 84 to the header 76. In use, when the level of recovered and recycled liquid product accumulated in the bottom of the condenser 40 reaches a predetermined point, the level control valve 84 is opened for passing the excess liquid product to the reservoir 100.

Finally, the bottom of the terminal stage condenser 50 is provided with a first liquid product outlet connected by a conduit 91 to the inlet of a pump 95, the outlet of the pump 95 being connected by a conduit 97 to the inlet of a heat exchanger 90 for cooling the liquid product by evaporation of refrigerant supplied by the closed-loop external refrigeration system 110. The outlet of the heat exchanger 90 is connected by a conduit 98 to a liquid product inlet adjacent to the upper end of the terminal stage condenser 50 for introducing refrigerated liquid product thereto. The refrigerated liquid product is cascaded downwardly through the terminal stage condenser 50 in countercurrent relationship with the residual vapor stream by means of spray nozzles 99 for direct contact with the upwardly flowing vapor stream from the conduit 45. In this manner, the residual vapor stream is further condensed to form additional liquid product components and the output vapor stream which is vented to atmosphere through the conduits 51 and 44 and the let-down drum 55. The recovered liquid product components and the liquid product from the nozzles 99 pass through the outlet conduit 91 for continuous recycling by the pump 95 through the condenser 50 and the heat exchanger 90.

The terminal stage condenser 50 is also provided adjacent to the lower end thereof with a second liquid product outlet connected to a conduit 93, which is in turn connected through a level control valve 94 to the header 76. The level control valve 94 operates in the same manner as the level control valves 74 and 84 for passing excess liquid product to the reservoir 100.

Since additional liquid product components may be condensed in the let-down drum 55, it is provided at the bottom thereof with a liquid product outlet which is connected by a conduit 103 to the header 76 through a level control valve 104 for passing the condensed liquid product components to the reservoir 100 when the level of condensed liquid in the let-down drum 55 reaches a predetermined point.

When the system 110 is started up, it may be necessary to borrow liquid product from the reservoir 100 to feed the saturating vessel 20 and the condensers 30, 40 and 50. For this purpose, liquid product may be pumped from the reservoir 100 to the pump 65 through the conduit 66 and the valve 66a. In addition, the conduit 66 is connected to a conduit 105, which is in turn connected through a valve 106 to the inlet of the pump 95. Branch conduits 107 and 108 are respectively connected from the conduit 105, downstream of the valve 106, to the pumps 75 and 85, respectively. Thus, when the valves 66a and 106 are opened, liquid product may be passed from the reservoir 100 to the pumps 75, 85 and 95 for starting up the condensers 30, 40 and 50, respectively.

The refrigeration system 110 includes a conduit 111, which is connected from the refrigerant outlets of each of the heat exchangers 60, 70, 80 and 90 to the inlets of two parallel single stage compressors 115. The outlets of the compressors 115 are connected by a conduit 116 to the inlet of condenser 117, the outlet of which is connected to an outlet conduit 119, which is in turn connected through a collector 118 to the refrigerant inlets of each of the heat exchangers 60, 70, 80 and 90. Thus, refrigerant is continuously recycled through the closed-loop refrigeration system 110 and through the heat exchangers 60, 70, 80 and 90 for refrigerating the liquid product passing therethrough. The refrigeration system 110 may be designed to use ammonia or one of the flourinated hydrocarbons, such as F12, or any other suitable refrigerant. By way of example, if ammonia were used as the refrigerant, the single stage compressors 115 would receive ammonia vapor from the heat exchangers 60, 70, 80 and 90 through conduit 111 at about 35°F. and 66 p.s.i.a. and compress it to about 180 p.s.i.a. at 90°F. The compressed vapor would then be recondensed in condenser 117, the condensed liquid ammonia then passing to the heat exchangers 60, 70, 80 and 90 through the receiver 118 of the conduit 119. The 35°F. temperature is selected to avoid freezing of condensed water vapor in the vapor stream, but lower temperatures could be used in the high pressure condensers.

While the recovery system 10 may be utilized to recover many different types of volatile products such as gasoline, butadiene, a wide range of hydrocarbons, etc., by way of example the operation of the system 10 will be described under the conditions which would prevail if the system 10 were utilized for recovery of liquid product from gasoline vapors, as at a gasoline terminal or distribution center. The gasoline vapor stream is passed through the flash arrester 12 and the conduit 11 to the inlet of the saturating vessel 20. With the system in operation, the incoming gasoline vapor stream will be saturated by the subcooled liquid product in the saturating vessel 20. Preferably, the recirculated liquid product is cooled in the heat exchanger 60 to 35°F., as explained above, so that the vapor stream leaving the saturating vessel 20 through the conduit 13 is saturated at about 40°F. The saturated vapor stream is then passed through the conduit 14 to the vapor surge tank 15. As described above, as long as the flow of vapor through the saturating vessel 20 continues at a predetermined rate, the system will be maintained in operation by the switch 19. As the incoming volume of vapor drops off, the switch 19 will be actuated to shut down the compressors and pumps of the system 10. The surge tank 15 insures that the vapor stored therein will remain saturated, thereby maintaining the hydrocarbon content thereof above the explosive range.

The saturated vapor stream is then passed through conduit 14 to the first stage of the compressor 25, for raising the pressure of the vapor stream to about 75 p.s.i.a. The compressed vapor stream is then passed through the conduit 22 to the vapor cooler 23, which is of the radiator-blower type, any liquid product condensation in the cooler 23 being drained off to the recirculation system of the first stage condenser 30 by gravity through the conduit 72. The vapor stream leaving the cooler 23 passes through the conduit 24 to the bottom of the condenser 30, where it is condensed by contact with refrigerated liquid product being recirculated through condenser 30 by the pump 75 and heat exchanger 70, the recirculated liquid product being cooled in the heat exchanger 70 to 35°F., as described above. The residual vapor stream from the condenser 30 is passed through the conduit 31 to the second stage of the condenser 25, in which the pressure of the vapor stream is raised to about 400 p.s.i.a. As in the first stage, the heat of compression if partly removed by the cooler 33 which is of the same type as the cooler 23. Any liquid product condensing in the cooler 23 is drained by gravity through the conduit 82 to the recirculation system of the second stage condenser 40.

The compressed and cooled vapor stream from the cooler 33 is passed by the conduit 34 to either or both of the condensers 40 and 50, depending upon the arrangement of the valves 36, 37, 42, 43, 46 and 48. Normally, the condensers 40 and 50 will be connected in series, in which case the vapor stream from the conduit 34 will be passed to the vapor inlet at the bottom of the condenser 40, the valve 37 being closed. These vapors will be further condensed by direct contact with the refrigerated liquid product being recirculated through the condenser 40, excess recovered liquid product being fed by way of level control valve 84 and conduit 83 to the header 76. The residual vapor stream from the condenser 40 is fed via conduit 41, valve 42, conduits 35 and 45 and valve 46 to the vapor inlet at the bottom of the terminal stage condenser 50. These residual vapors are further condensed by direct contact with the recirculated refrigerant liquid product flowing through the condenser 50, the excess recovered liquid product being fed by way of conduit 93 and level control valve 94 to the header 76. The uncondensed vapors from the condenser 50 are fed via the outlet conduit 51 and the vent conduit 44 through back pressure valve 52 to the let-down drum 55. Further condensation of vapors may occur in the let-down drum 55, the thus condensed liquid product being fed by way of conduit 105 and the level control valve 104 to the header 76. The uncondensed vapors are vented to atmosphere through the vent conduit 56 and the back pressure valve 57, the back pressure valve 57 maintaining a predetermined intermediate pressure in the let-down drum 55.

While the condensers 40 and 50 will normally be connected in series as described above, they may be connected in parallel on the vapor side, if such connection becomes desirable for recovering products or mixtures of different vapor pressures. Further, the valves in the vapor conduits may be conditioned for bypassing either or both of the condensing stages 40 and 50, if it is desirable to operate with a single condensing stage. While, the invention has been described with three condensing stages, including two stages which are each provided with inlet vapor compressors and a terminal stage which is not provided with a vapor compressor, it will be appreciated that any other number of stages may advantageously be provided.

During initial plant start-up, it will be necessary to borrow liquid product from the reservoir 100 in order to start the liquid product recirculating through the saturating vessel 20 and the condensers 30, 40 and 50. Thus, conduit 66 is provided for passing liquid product from the reservoir 100 to the pump 65 through the valve 66a, and conduits 105, 107 and 108 are provided for passing liquid product from the reservoir 100 through the valve 106 to the pumps 75, 85 and 95. After the system is in operation, the valves 66a and 106 are closed, since a predetermined volume of liquid product will remain circulating through the saturating vessel 20 and the condensers 30, 40 and 50. Once the system is in operation, the compressors and pumps thereof will operate in response to the actuating switch 19 coupled to the vapor surge tank 15. Thus, the system will be maintained in operation as long as a predetermined vapor flow is being introduced to the system, the pumps and compressors being shut off if this vapor flow is terminated or is appreciably reduced. In normal operation, a vapor flow of approximately 200 cubic feet per minute, for example, may typically pass through the system.

It will be observed that in the system of the present invention, the volatile liquid product components are separated from the vapor stream by condensation at their partial pressures at refrigerated temperatures, whereby the separation of very low boiling products is permitted and, since the product removal is by direct contact of the vapor with the recirculated liquid product, there is no loss of refrigeration efficiency due to temperature difference. It will be observed that the temperature of the recirculated liquid product is maintained substantially constant throughout the system (about 35°F. for the example described above), the condensation of increasingly lower boiling components of the vapor stream being accommodated by the successively increasing pressures in the condenser stages.

From the foregoing, it will be seen that there has been provided a novel system for recovering the volatile liquid products from the vapor streams, the system affording efficient recovery of the volatile liquids at low temperatures.

More particularly, there has been provided a recovery system which effects compression of the vapor stream followed by direct contact of the pressurized vapor stream with recirculating subcooled liquid product, the liquid product being cooled by evaporation of refrigerant in an external closed-loop refrigeration system.

There has also been provided a recovery system which includes a plurality of condensing stages operated at successively higher pressures, and a terminal condensing stage which may be connected in the vapor stream either in series or in parallel with the preceeding condenser stage.

Finally, there has been provided means for saturating the incoming vapor stream at a low temperature by direct contact thereof with a refrigerated recirculating liquid product.

While there has been described what is at present considered to be the preferred embodiment of the present invention, it will be understood that various modifications may be made therein and it is intended to cover in the appended claims all such modifications as fall within the true spirit and scope of the invention.

What is claimed is:

1. Apparatus for recovering volatile liquids from a vapor stream, said apparatus comprising a plurality of introductory stages and a terminal stage of condensing apparatus; each of said introductory stages including a compressor having an inlet and an outlet, vapor cooling means having an inlet connected to the outlet of said compressor and an outlet, a condenser having a vapor inlet and a vapor outlet and a liquid product inlet and first and second liquid product outlets, said vapor inlet being disposed adjacent to the bottom of said condenser and being connected to the outlet of said vapor cooling means for introducing a cooled compressed vapor stream into said condenser, liquid product cooling means having an inlet connected to the first liquid product outlet of said condenser and an outlet and being operative for subcooling recovered liquid product to a temperature below that of the cooled compressed vapor stream, said liquid product inlet being disposed adjacent to the top of said condenser and being connected to the outlet of said liquid product cooling means for introducing subcooled liquid product into said condenser in countercurrent relationship and direct contact with the cooled compressed vapor stream to effect condensation thereof and thereby form liquid product and a residual vapor stream; said terminal stage including a condenser having a vapor outlet and a liquid product liquid product inlet and first and second liquid product outlets, said terminal stage vapor inlet being disposed adjacent to the bottom of said terminal stage condenser for introducing thereinto the residual vapor stream from said last introductory stage, terminal stage liquid product cooling means having an inlet connected to the first liquid product outlet of said terminal stage condenser and an outlet and being operative for subcooling recovered liquid product to a temperature below that of the last residual vapor stream, said terminal stage liquid product inlet being disposed adjacent to the top of said terminal stage condenser and being connected to the outlet of said terminal stage liquid product cooling means for introducing subcooled liquid product into said terminal stage condenser in countercurrent relationship and direct contact with said last residual vapor stream to effect condensation thereof and thereby form liquid product and an output vapor stream; the inlet of said first introductory stage compressor being connected to a vapor source for delivering an input vapor stream to said compressor; the inlet of the compressor of each of said other stages being connected to the vapor outlet of the condenser of the immediately preceding stage for receiving the residual vapor stream therefrom; vent means connected to the vapor outlet of said terminal stage condenser for discharging to the atmosphere the output vapor stream therefrom; and a liquid product reservoir connected to the second liquid product outlet of each of said condensers for receiving and storing recovered liquid product.

2. Apparatus for recovering volatile combustible liquids from a vapor stream, said apparatus comprising vapor saturating apparatus and condensing apparatus; said vapor saturating apparatus including a saturating vessel having a vapor inlet and a vapor outlet and a liquid product inlet and a liquid product outlet, said vapor inlet being disposed adjacent to the bottom of said saturating vessel and being connected to a vapor source for delivering an input vapor stream to said saturating vessel, liquid product cooling means having an inlet connected to the liquid product outlet of said saturating vessel and an outlet and being operative for cooling liquid product to a temperature below that of the input vapor stream, said liquid product inlet being disposed adjacent to the top of said saturating vessel and being connected to the outlet of said liquid product cooling means for introducing cooled liquid product into said saturating vessel in countercurrent relationship and direct contact with the vapor stream to cool and saturate the input vapor stream and form a nonexplosive saturated vapor stream; said condensing apparatus including a compressor having an inlet connected to the vapor outlet of said saturating vessel for receiving the saturated vapor stream and an outlet, vapor cooling means having an inlet connected to the outlet of said compressor and an outlet, a condenser having a vapor inlet and a vapor outlet and a liquid product inlet and first and second liquid product outlets, said condenser vapor inlet being disposed adjacent to the bottom of said condenser and being connected to the outlet of said vapor cooling means for introducing the cooled compressed vapor stream into said condenser, condenser liquid product cooling means having an inlet connected to the first liquid product outlet of said condenser and an outlet and being operative for subcooling recovered liquid product to a temperature below that of the cooled compressed vapor stream, said condenser liquid product inlet being disposed adjacent to the top of said condenser and being connected to the outlet of said condensers liquid product into said condenser in countercurrent relationship and direct contact with the cooled compressed vapor stream to effect condensation thereof and thereby form liquid product and a residual vapor stream; vent means connected to the vapor outlet of said condenser for discharging to the atmosphere the residual vapor stream therefrom; and a liquid product reservoir connected to the second liquid product outlet of said condenser for receiving and storing recovered liquid product.

3. The apparatus set forth in claim 1, and further including a closed-loop external refrigeration system, each of said liquid product cooling means comprising a heat exchanger connected in said closed-loop refrigeration system.

4. The apparatus set forth in claim 1, and further including coupling means connecting said terminal stage to said introductory stages and being shiftable between first and second conditions, said coupling means in the first condition thereof connecting the vapor inlet of said terminal stage condenser to the vapor outlet of the last introductory stage condenser, said coupling means in the second condition thereof connecting the vapor inlet of said terminal stage condenser to the vapor inlet of said last introductory stage.

5. Apparatus for recovering volatile combustible liquids from a vapor stream, said apparatus comprising vapor saturating apparatus and a plurality of introductory stages and a terminal stage of condensing apparatus; said vapor saturating apparatus including a saturating vessel having a vapor inlet and a vapor outlet and a liquid product inlet and a liquid product outlet, said vapor inlet being disposed adjacent to the bottom of said saturating vessel and being connected to a vapor source for delivering an input vapor stream to said saturating vessel, liquid product cooling means having an inlet connected to the liquid product outlet of said saturating vessel and an outlet and being operative for cooling liquid product to a temperature below that of the input vapor stream, said liquid product inlet being disposed adjacent to the top of said saturating vessel and being connected to the outlet of said liquid product cooling means for introducing cooled liquid product into said saturating vessel in countercurrent relationship and direct contact with the input vapor stream to cool and saturate the input vapor stream and form a nonexplosive saturated vapor stream; each of said introductory stages including a compressor having an inlet and an outlet, vapor cooling means having an inlet connected to the outlet of said compressor and an outlet, a condenser having a vapor inlet and a vapor outlet and a liquid product inlet and first and second liquid product outlets, said vapor inlet being disposed adjacent to the bottom of said condenser and being connected to the outlet of said vapor cooling means for introducing a cooled compressed vapor stream into said condenser, liquid product cooling means having an inlet connected to the first liquid product outlet of said condenser and an outlet and being operative for subcooling recovered liquid product to a temperature below that of the cooled compressed vapor stream, said liquid product inlet being disposed adjacent to the top of said condenser and being connected to the outlet of said liquid product cooling means for introducing subcooled liquid product into said condenser in countercurrent relationship and direct contact with the cooled compressed vapor stream to effect condensation thereof and thereby form liquid product and a residual vapor stream; said terminal stage including a condenser having a vapor inlet and a vapor outlet and a liquid product inlet and first and second liquid product outlets, said terminal stage vapor inlet being disposed adjacent to the bottom of said terminal stage condenser for introducing thereinto the residual vapor stream from said last introductory stage, terminal stage liquid product cooling means having an inlet connected to the first liquid product outlet of said terminal stage condenser and an outlet and being operative for subcooling recovered liquid product to a temperature below that of the last residual vapor stream, said terminal stage liquid product inlet being disposed adjacent to the top of said terminal stage condenser and being connected to the outlet of said terminal stage liquid product cooling means for introducing subcooled liquid product into said terminal stage condenser in countercurrent relationship and direct contact with said last residual stream to effect condensation thereof and thereby form liquid product and an output vapor stream; the inlet of said first introductory stage compressor being connected to the vapor outlet of said saturating vessel for receiving the saturated vapor stream therefrom; the inlet of the compressor of each of said other introductory stages being connected to the vapor outlet of the condenser of the immediately preceding introductory stage for receiving the residual vapor stream therefrom; vent means connected to the vapor outlet of said terminal stage condenser for discharging to the atmosphere the output vapor stream therefrom; a liquid product reservoir connected to the second liquid product outlet of each of said condensers for receiving and storing recovered liquid product.

6. The apparatus set forth in claim 5, and further including a closed-loop external refrigeration system, each of said liquid product cooling means comprising a heat exchanger connected in said closed-loop refrigeration system.

7. The apparatus set forth in claim 5, and further including means coupling the liquid product outlet of said saturating vessel to said reservoir for passing excess liquid product to said reservoir.

8. A method for recovering volatile hydrocarbon liquids from an input gasoline vapor stream, comprising the steps of passing the input gasoline vapor stream through a series of condensing stages; each of said condensing stages including the steps of compressing the gasoline vapor stream, precooling the compressed gasoline vapor stream with an ambient air stream, then condensing the compressed and precooled gasoline vapor stream by passing said vapor stream in countercurrent relationship and direct contact with a recirculating stream of liquid hydrocarbon product at a temperature below that of the cooled compressed gasoline vapor stream to form additional condensed liquid hydrocarbon product and a residual vapor stream of uncondensed hydrocarbon components, continuously recirculating and refrigerating a portion of the recovered liquid hydrocarbon product for use in the condensing step, passing the remainder of the recovered liquid hydrocarbon product to a storage reservoir; and venting the uncondensed residual vapor stream from the last condensing stage to atmosphere.

* * * * *